United States Patent
Ko et al.

(10) Patent No.: US 10,492,201 B2
(45) Date of Patent: Nov. 26, 2019

(54) METHOD AND APPARATUS FOR COMMUNICATION USING MULTIPLE TTI STRUCTURES

(71) Applicant: LG ELECTRONICS INC., Seoul (KR)

(72) Inventors: Hyunsoo Ko, Seoul (KR); Kwangseok Noh, Seoul (KR); Dongkyu Kim, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 16/060,008

(22) PCT Filed: Nov. 10, 2016

(86) PCT No.: PCT/KR2016/012925
§ 371 (c)(1),
(2) Date: Jun. 6, 2018

(87) PCT Pub. No.: WO2017/099369
PCT Pub. Date: Jun. 15, 2017

(65) Prior Publication Data
US 2018/0359751 A1 Dec. 13, 2018

Related U.S. Application Data

(60) Provisional application No. 62/263,717, filed on Dec. 6, 2015.

(51) Int. Cl.
*H04W 72/04* (2009.01)
*H04L 5/00* (2006.01)

(52) U.S. Cl.
CPC ....... *H04W 72/0446* (2013.01); *H04L 5/0053* (2013.01); *H04L 5/0092* (2013.01); *H04L 5/0007* (2013.01); *H04L 5/0055* (2013.01)

(58) Field of Classification Search
None
See application file for complete search history.

(56) References Cited

U.S. PATENT DOCUMENTS

| 2015/0188650 A1 | 7/2015 | Au et al. |
| 2015/0334686 A1 | 11/2015 | Ji et al. |

(Continued)

FOREIGN PATENT DOCUMENTS

| KR | 1020090031410 | 3/2009 |
| KR | 1020090057305 | 6/2009 |

(Continued)

OTHER PUBLICATIONS

PCT International Application No. PCT/KR2016/012925, Written Opinion of the International Searching Authority dated Feb. 17, 2017, 17 pages.

(Continued)

*Primary Examiner* — Hong S Cho
(74) *Attorney, Agent, or Firm* — Lee Hong Degerman Kang Waimey

(57) ABSTRACT

The document relates to a method for performing communication using multiple transmission time interval (TTI) structures in a wireless communication system. In this method, a terminal transmits and receives a signal through a resource region in which a first subframe corresponding to a TTI (short TTI) of a first length and a second subframe corresponding to a TTI (short TTI) of a second length longer than the first length are multiplexed in a frequency divisional multiplexing (FDM) manner, and when a second link direction of a signal transmitted through the second subframe in a specific time interval is different from a first link direction of a signal transmitted through the first subframe, the specific time interval of the second subframe is not used for signal transmission in the second link direction.

12 Claims, 14 Drawing Sheets

(56) References Cited

U.S. PATENT DOCUMENTS

2017/0303171 A1* 10/2017 Jonsson ................ H04L 5/0053
2018/0359745 A1* 12/2018 Yeo ........................ H04L 1/18

FOREIGN PATENT DOCUMENTS

| KR | 101143171 | 5/2012 |
|----|-----------|--------|
| KR | 1020130020487 | 2/2013 |
| KR | 101348055 | 1/2014 |
| KR | 101356533 | 2/2014 |
| KR | 1020140030072 | 3/2014 |
| KR | 1020150016371 | 2/2015 |

OTHER PUBLICATIONS

Samsung, "Study on specification impact for downlink due to TTI shortening", 3GPP TSG RAN WG1 Meeting #83, R1-156819, Nov. 2015, 6 pages.
ETRI, "Discussion on TTI shortening", 3GPP TSG RAN WG1 Meeting #83, R1-157110, Nov. 2015, 8 pages.
Intel, "Disucssion on TTI Shortening", 3GPP TSG RAN WG1 Meeting #83, R1-156540, Nov. 2015, 5 pages.

* cited by examiner

METHOD AND APPARATUS FOR COMMUNICATION USING MULTIPLE TTI STRUCTURES

CROSS-REFERENCE TO RELATED APPLICATIONS

This application is the National Stage filing under 35 U.S.C. 371 of International Application No. PCT/KR2016/012925, filed on Nov. 10, 2016, which claims the benefit of U.S. Provisional Applications No. 62/263,717, filed on Dec. 6, 2015, the contents of which are all hereby incorporated by reference herein in their entirety.

TECHNICAL FIELD

The following description relates to a method for transmitting and receiving a signal using multiple TTI (Transmission Time Interval) structures in a next generation wireless communication system and an apparatus for the same.

BACKGROUND ART

FIG. 1 is a diagram for explaining a delay which is occurred when a downlink signal transmission is processed in LTE system.

As shown in FIG. 1, 1 TTI (Transmit Time Interval) has a length of 1 ms in LTE system. If an eNB transmits data to a UE, the data arrives at the UE after time as much as "A" is delayed. The time corresponds to propagation delay in wireless communication.

Having received the data, the UE requires time as much as B, C, D, E, and F for buffering the data, decoding a control channel, decoding the data, preparing a response signal, and transmitting the response signal prior to time corresponding to a trimming advanced.

In general, in LTE system, a delay of 4 ms corresponding to 4 TTI occurs until a confirmation response of a UE is received after data is transmitted from an eNB.

DISCLOSURE

Technical Problem

An object of 5G mobile communication system, which is considered as a following model of the LTE system, is to implement a low-delay communication by reducing the delay to 1 ms or lower.

In case of introducing a massive MIMO system, which is expected to be applied in 5G mobile communication system, it is highly probable that a radio frame of TDD structure is to be used to solve a pilot contamination problem. On the contrary, in case of using a TDD radio frame structure of LTE system, it may be more difficult to satisfy the above-mentioned delay reduction condition.

Also, as the 5G mobile communication system provides various services, it is expected that a case that it is favorable to use a short TTI and a case that it is favorable to use a long TTI coexist. However, if subframes corresponding to TTIs of different lengths are simply multiplexed, a problem may occur in that self-interference and response delay may be caused.

Technical Solution

To achieve the object of the present invention, in one aspect of the present invention, a method for performing communication using multiple transmission time interval (TTI) structures in a wireless communication system comprises the step of transmitting and receiving a signal through a resource region in which a first subframe corresponding to a TTI (short TTI) of a first length and a second subframe corresponding to a TTI (short TTI) of a second length longer than the first length are multiplexed in a frequency divisional multiplexing (FDM) mode, wherein if a second link direction of a signal transmitted through the second subframe at a specific time interval is different from a first link direction of a signal transmitted through the first subframe, the specific time interval of the second subframe is not used for signal transmission in the second link direction.

Each of the first link direction and the second link direction may be an uplink or a downlink.

Preferably, the specific time interval which is not used for signal transmission in the second link direction at the second subframe is signaled through a downlink control channel.

The specific time interval which is not used for signal transmission in the second link direction at the second subframe may be used for signal transmission in the first link direction.

The second subframe may include a downlink dedicated interval, an uplink or downlink variable interval, and an uplink dedicated interval in due order, and the first subframe may be located at a position corresponding to the uplink or downlink variable interval of the second subframe.

The first subframe may include a first type subframe, which includes a downlink dedicated interval, an uplink or downlink variable interval, and an uplink dedicated interval in due order, and a second type subframe in which one or more of the downlink dedicated interval, the uplink or downlink variable interval and the uplink dedicated interval is omitted.

The first subframe may be arranged at the time interval at which the variable interval of the second subframe is used for signal transmission in the second link direction, so that the first subframe may be used for signal transmission of the second link direction within a predetermined threshold range, and a signal transmission interval of the first link direction of the first subframe may be configured if the first subframe exceeds the predetermined threshold range.

The first subframe and the second subframe may be allocated to different UEs.

The first subframe and the second subframe may additionally be multiplexed in a TDM mode.

If a signal transmission interval of the second link direction for receiving a response to signal transmission of the first link direction of the first subframe is far away from a predetermined interval or more, the signal transmission interval of the second link direction may additionally be configured within the second subframe.

In another aspect of the present invention, an apparatus for performing communication using multiple transmission time interval (TTI) structures in a wireless communication system comprises a transceiver for transmitting and receiving a signal through a resource region in which a first subframe corresponding to a TTI (short TTI) of a first length and a second subframe corresponding to a TTI (short TTI) of a second length longer than the first length are multiplexed in a frequency divisional multiplexing (FDM) mode, and a processor for controlling a specific time interval of the second subframe not to be used for signal transmission in a second link direction if the second link direction of a signal transmitted through the second subframe at the specific time interval is different from a first link direction of a signal transmitted through the first subframe.

The processor may be configured to identify information on the specific time interval which is not used for signal transmission in the second link direction at the second subframe through a downlink control channel.

The second subframe may include a downlink dedicated interval, an uplink or downlink variable interval, and an uplink dedicated interval in due order, and the first subframe may be located at a position corresponding to the uplink or downlink variable interval of the second subframe.

The first subframe may include a first type subframe, which includes a downlink dedicated interval, an uplink or downlink variable interval, and an uplink dedicated interval in due order, and a second type subframe in which one or more of the downlink dedicated interval, the uplink or downlink variable interval and the uplink dedicated interval is omitted.

The first subframe and the second subframe may additionally be multiplexed in a TDM mode.

Advantageous Effects

According to the present invention as described above, a TTI may be configured flexibly in accordance with a service type in a next generation mobile communication system.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the present invention relates to a communication system using multiple TTI structures in a next generation wireless communication system. To this end, as an example of a next generation system to which the present invention is applied, a 5G mobile communication system will be described.

Figure 2:
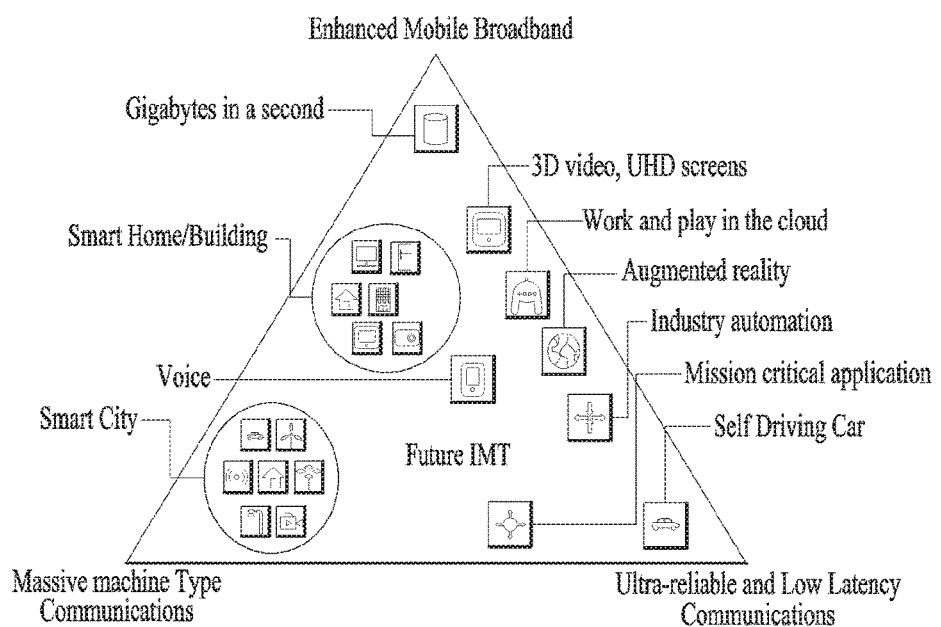
FIG. 2 is a diagram illustrating a usage scenario of a next generation mobile communication system to which the present invention will be applied.

FIG. 2 is a diagram illustrating a usage scenario of a next generation mobile communication system to which the present invention will be applied.

As shown in FIG. 2, the next generation mobile communication system aims to use an improved broadband, accommodate massive machine type communication, and support high confidence communication of low latency.

The improved mobile broadband may enable communication of gigabyte per second and enable communication of 3D video or UHD screen information. Also, in accordance with massive machine type communication, smart city may be implemented, and it is expected that high confidence low latency communication will enable a driverless car.

Meanwhile, as described above, it is in the 5G mobile communication system, it is promising that a TDD structure will be used for support of a massive MIMO system. To this end, a TDD radio frame structure will be described.

Figure 3:
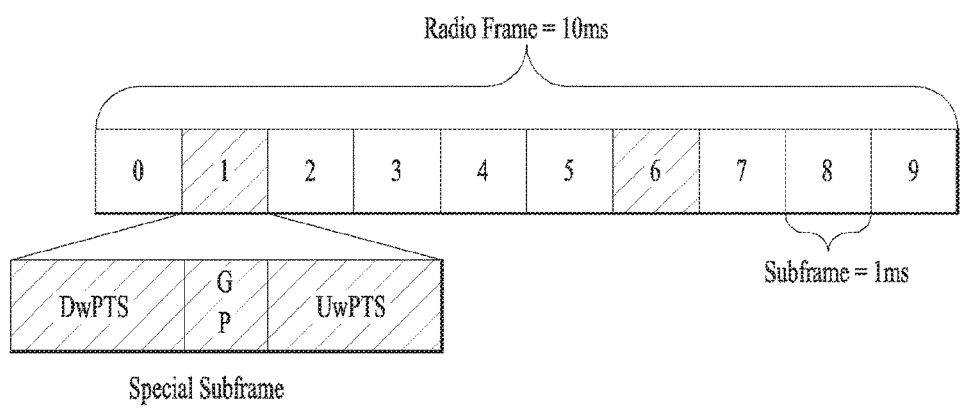
FIG. 3 is a diagram illustrating a TDD radio frame structure.

FIG. 3 is a diagram illustrating a TDD radio frame structure.

Although the TDD radio frame shown in FIG. 3 is a radio frame structure of a 4G LTE system, this structure may be used unless mentioned specifically.

The TDD radio frame of the LTE system has a length of 10 ms, and includes 10 subframes. Therefore, one subframe has a length of 1 ms. In FIG. 3, special subframes such as subframes 1 and 6 are subframes for DL/UL conversion, and a DL pilot time slot DwPTS has a length of 3 to 12 OFDM symbols, a guard period GP has a length of 1 to 10 OFDM symbols, and a UL pilot time slot UpPTS has a length of 1 to 2 OFDM symbols.

In the 4G LTE radio frame structure shown in FIG. 3, 1 TTI is a length of 1 ms and corresponds to 1 subframe.

Meanwhile, in case of the TDD mode in the 5G mobile communication system as described above, a request for TTI structures of various lengths exists in accordance with various delay requirements.

Figure 4:
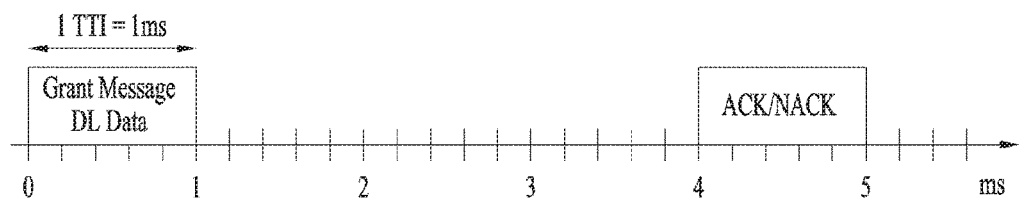
FIGS. 4 and 5 are diagrams illustrating a request for TTIs of various lengths in a 5G mobile communication system.
Figure 5:
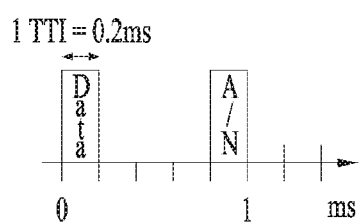

FIGS. 4 and 5 are diagrams illustrating a request for TTIs of various lengths in a 5G mobile communication system.

First of all, FIG. 4 illustrates a concept that TTI of 1 ms length is required for improved mobile broadband communication in the 5G mobile communication system. In this type communication, OTA latency of 5 ms or less is required.

Meanwhile, for low latency high confidence communication, a TTI of a short length, for example, a TTI of 0.2 ms is required as shown in FIG. 5, and it is required that OTA latency for this type of communication should be 1 ms or less.

Figure 6:
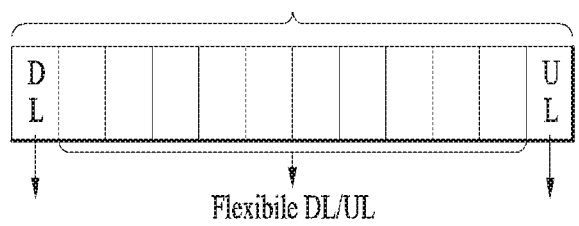
FIG. 6 is a diagram illustrating a subframe structure of a 5G mobile communication system according to one embodiment of the present invention.

FIG. 6 is a diagram illustrating a subframe structure of a 5G mobile communication system according to one embodiment of the present invention.

If communication is performed in a TDD mode in the 5G mobile communication system, it is suggested that a subframe structure, which includes a downlink dedicated interval, an uplink or downlink variable interval and an uplink dedicated interval in due order as shown in FIG. 6, should be used. This may prevent a response to a signal transmitted to a random link of one direction from being too delayed, and a variable interval is configured in accordance with a system status to perform flexible communication.

The subframe structure shown in FIG. 6 may be referred to as a self-contained frame structure. In the self-contained frame structure, the downlink dedicated interval may be used to transmit downlink control channel information, the variable interval may be used for data channel transmission, and the uplink dedicated interval may be used for uplink control channel transmission.

To satisfy technical requirements of various services of 5G, Flexibility and Scalability should be important aims of 5G Air-Interface design.

[eMBB] In a new Air-Interface solution for a Mobile Broadband Scenario using Ultra High Data Rate and Reduced Latency as important targets, it is preferable to design OFDM based Air-Interface design optimized for Dense Deployment. For efficient spectrum use, communication is performed in a TDD mode, and DL and UL are designed in symmetrically, and a frame suitable for use in a cm wave band and an mm wave band is designed. Also, to minimize cost and complexity, a unified frame for various link types (e.g., self-backhauling, D2D, etc.) is designed. Considering an ultra dense network together with a small cell environment property, a physical layer numerology (subcarrier spacing, cyclic prefix and guard band times) is optimized. Design optimized for TDD aims to reduce latency and simplify processing.

[uMTC] Air-interface design for a moving network or V2X (vehicular to something), which includes traffic safety application service and wireless broadband access of a vehicle riding user, aims to provide ultra-high reliability as an important target. Frame design that enables channel prediction and channel estimation considering high Doppler is required, and frame design capable of supporting multiple accesses is required.

[mMTC] 5G Air Interface design should be designed together with design for low-cost MTC and D2D devices. Frame design for supporting multiple accesses capable of improving coverage of the MTC device and reducing access load of massive devices is required.

Based on the aforementioned description, a method for multiplexing subframes of different TTI lengths in a TDD structure will be described hereinafter.

As described above, a request for a flexible application of a TTI length suitable for latency requirements varied depending on a service type is increased. For example, if Ultra-Reliable Low Latency Communication (1 ms Latency) and Enhanced Mobile Broad Band (10 ms Latency), which are different from each other in latency requirements as much as 10 times, are served by one fixed TTI length (0.2 ms or 1 ms), usage efficiency of resources may be reduced or service requirements cannot be satisfied.

Ex. 1) Requirements of Ultra-Reliable Low Latency Communication service cannot be satisfied by of 1 ms TTI.

Ex. 2) If an Enhanced Mobile Broadband Service is supported by 0.2 ms TTI, load to read a control channel per TTI or load in increasing the number of ACK/NACK reporting times occurs.

Therefore, it is preferable to variably design TTI in accordance with each service type.

However, a special method for supporting different types of services through one carrier should be considered. Particularly, DL and UL transmission timings are defined in the TDD mode, and if subframes of different TTIs are subjected to frequency domain multiplexing for service types of which latency requirements are different, a self-interference signal may occur, and if the subframes are subjected to time domain multiplexing, a problem may occur in that latency is increased.

Figure 7:
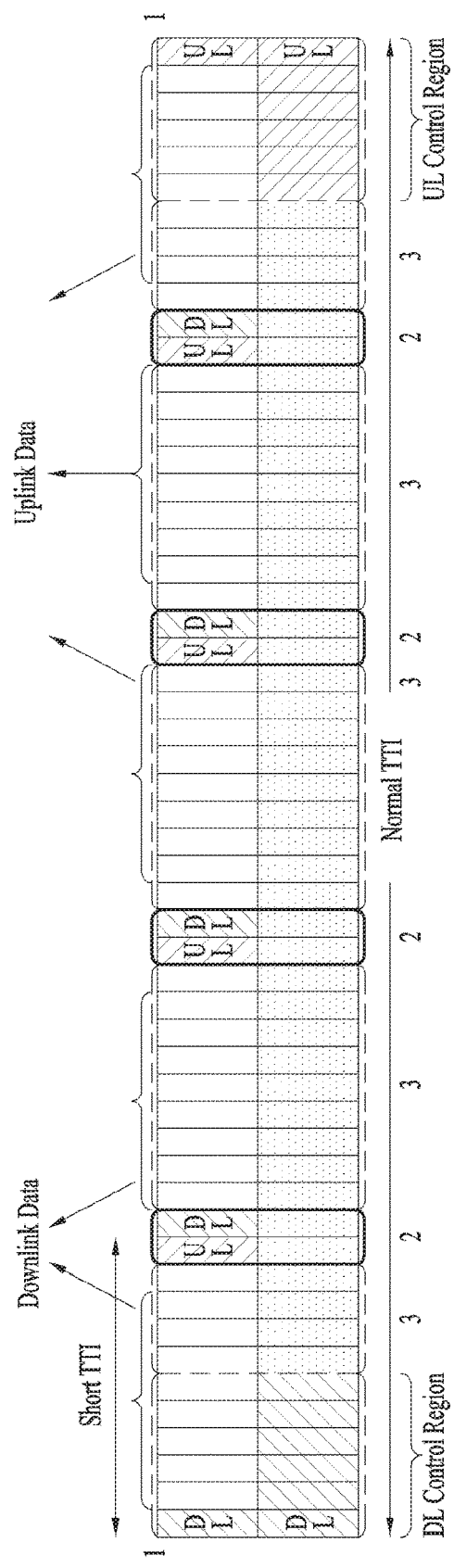
FIG. 7 is a diagram illustrating a problem occurring when subframes corresponding to TTIs of different lengths are multiplexed in an FDD mode.

FIG. 7 is a diagram illustrating a problem occurring when subframes corresponding to TTIs of different lengths are multiplexed in an FDD mode.

First of all, the following problems may occur in an area where a control signal and a data signal are overlapped as shown in (1) of FIG. 7. Specifically, if data of a short TTI area are flexibly varied to DL/UL and its link direction is opposite to DL control or UL control of a normal TTI area, a self-interference signal may occur.

Next, a problem may occur between the control signal and the data signal as shown in (2) of FIG. 7. If data of the normal TTI area are flexibly varied to DL/UL at a UL/DL only transmission period of the short TTI area, the self-interference signal may occur.

Also, a problem may also occur between the control signal and the data signal as shown in (3) of FIG. 7. If data of the normal TTI area are flexibly varied to DL/UL at a UL/DL only transmission time of the short TTI area, the self-interference signal may occur.

Figure 8:
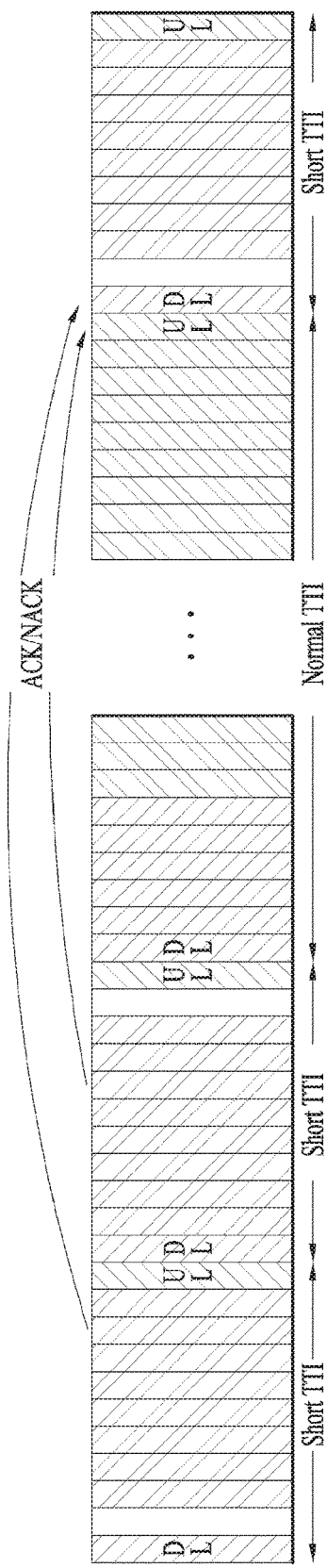
FIG. 8 is a diagram illustrating a problem occurring when subframes corresponding to TTIs of different lengths are multiplexed in a TDD mode.

FIG. 8 is a diagram illustrating a problem occurring when subframes corresponding to TTIs of different lengths are multiplexed in a TDD mode.

It has been described that a response to the data signal of the short TTI area is transmitted after K+N subframe. As shown in FIG. 8, if a normal TTI starts before N subframe in view of a short TTI, latency may occur as much as a standby time until a DL or UL control channel interval for transmitting the response to short TTI data occurs.

First of all, the embodiments of the present invention, which will be suggested later, are based on that a transmission direction is configured in one direction if subframes having different TTIs are subjected to FDM.

When subframes of a normal TTI and subframes of a short TTI are subjected to FDM, it is preferable that a link direction of a transmission channel which belongs to the short TTI area is the same as a link direction of a transmission channel which belongs to the normal TTI area.

For example, if downlink data transmission is performed at a normal TTI, downlink data transmission is performed for data of a short TTI subframe overlapped with the normal TTI area. On the contrary, if uplink data transmission is performed at a normal TTI, uplink data transmission is performed for the short TTI subframe.

For example, when a downlink dedicated transmission interval (e.g., downlink control channel dedicated interval) or uplink dedicated transmission interval (e.g., uplink control channel dedicated interval) of normal TTI subframes is set to N symbols, a flexible DL/UL area of the short TTI subframes performs transmission to the same link as a link direction of the dedicated transmission interval of the normal TTI subframes.

Figure 9:
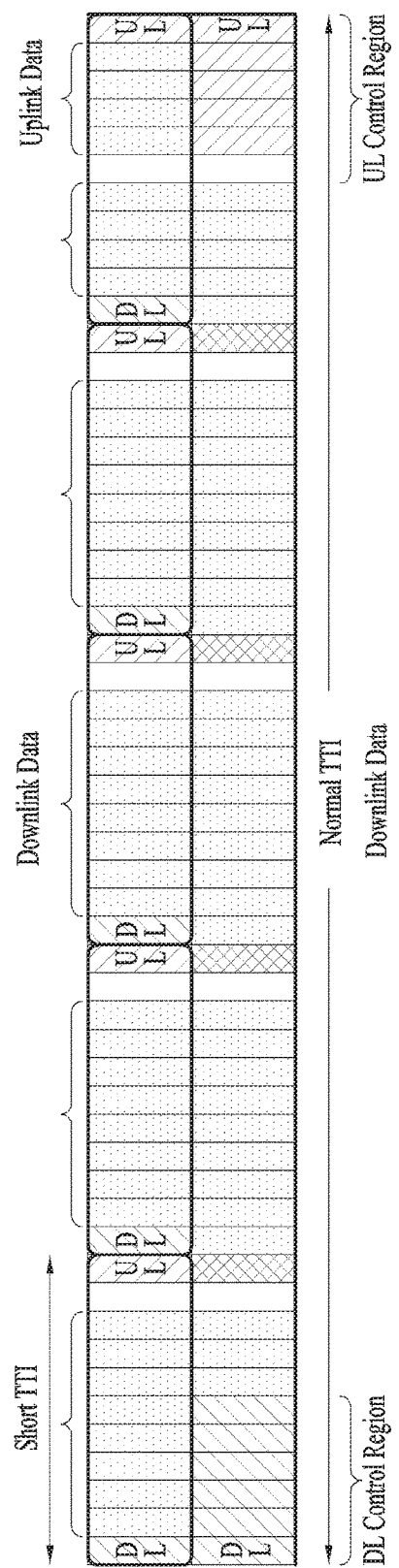
FIGS. 9 and 10 are diagrams illustrating a method for configuring a muting interval in a flexible DL/UL area at normal TTI subframes in accordance with one embodiment of the present invention.
Figure 10:
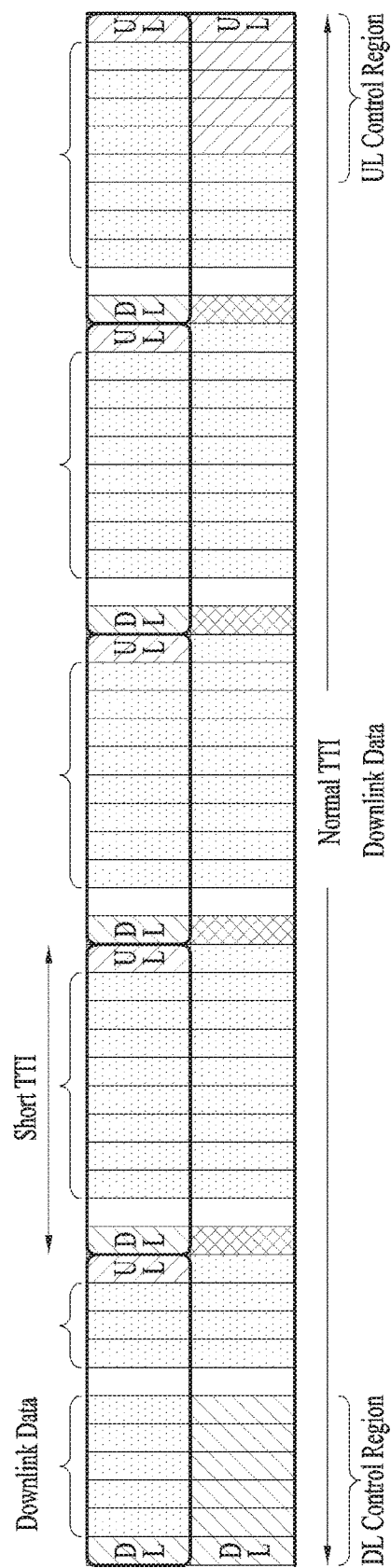

FIGS. 9 and 10 are diagrams illustrating a method for configuring a muting interval in a flexible DL/UL area at normal TTI subframes in accordance with one embodiment of the present invention.

If a downlink dedicated transmission interval, an uplink dedicated transmission interval and a guard period are all included in the short TTI subframes, the muting interval may be configured in the normal TTI area overlapped with the short TTI subframes as shown in FIG. 9.

For example, if the uplink dedicated transmission interval of the short TTI subframes are overlapped with the downlink data transmission interval of the normal TTI area, downlink data transmission of the normal TTI area may be muted to prevent contention with the short TTI uplink from occurring. At this time, if the guard period is included between the downlink transmission interval and the uplink transmission interval in the short TTI area, the guard period may also be configured in the normal TTI area.

Similarly, if the downlink dedicated transmission interval of the short TTI area are overlapped with the uplink data transmission interval of the normal TTI area, uplink data transmission of the normal TTI area is muted. If the guard period is configured in the short TTI area, the guard period may also be configured in the normal TTI area.

In the aforementioned multi-TTI structure, flexibility may be provided in view of scheduling as compared with the case that short TTI is only used. That is, the short TTI may be used for scheduling for a plurality of UEs, and the normal TTI may be used for simple scheduling for a single UE.

An example for the aforementioned embodiment suggests to indicate whether a muting interval of signal transmission exists within the normal TTI subframe.

It is assumed that data transmission is not performed in the area where muting is configured. If downlink transmission is performed at the normal TTI subframe, an eNB does not perform data transmission at the muting interval, and a UE does not regard the signal received at the muting interval as data. If uplink transmission is performed at the normal TTI subframe, the UE does not perform uplink data transmission.

An indicator may be included in the DL control channel. For example, the muting interval may be promised as a specific OFDM symbol position (specified or indicated by a higher layer signal). N-bit indicator may be configured in a bit field constituting downlink control information to indicate whether muting is performed at the corresponding subframe.

Meanwhile, another embodiment suggests to perform link transmission opposite to data transmission link at the muting interval of the normal TTI subframe.

For example, when downlink transmission is indicated and a specific interval is muted in a flexible DL/UL area of the normal TTI subframe, the muting interval enables uplink transmission. On the contrary, if uplink transmission is indicated and the muting interval is configured in the flexible DL/UL area of the normal TTI subframe, the muting interval enables downlink transmission.

At this time, it is preferable that the aforementioned transmission using the muting interval is transmission to another UE in addition to a UE which uses normal TTI.

Transmission at the muting interval may be performed in accordance with a command of the eNB.

For example, when downlink transmission and the muting interval exists at the normal TTI subframe, resources of the muting interval may be used for uplink transmission and allocated to a user who requests uplink transmission. The resources of the muting interval may be used for sounding reference signal transmission for channel state information, and ACK/NACK reporting and scheduling request for downlink data performed at a previous subframe (short TTI/normal TTI subframe).

Also, when uplink transmission and the muting interval exists at the normal TTI subframe, the resources of the muting interval may be used for downlink transmission and allocated to a user who requests downlink transmission. The resources of the muting interval may be used for reference signal transmission for channel state information, and ACK/NACK reporting for interference measurement reference signal for interference channel measurement and uplink data performed at a previous subframe (short TTI/normal TTI subframe).

Meanwhile, in another embodiment of the present invention, a method for positioning short TTI subframes at a flexible DL/UL interval of the normal TTI subframe is suggested.

Figure 11:
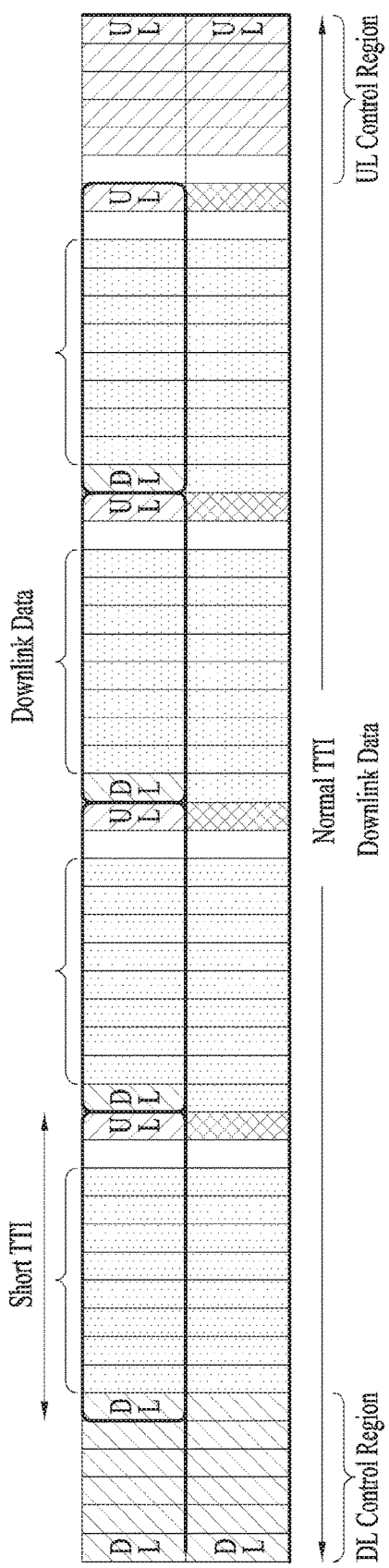
FIG. 11 is a diagram illustrating a method for positioning short TTI subframes at a flexible DL/UL interval of normal TTI subframes in accordance with one embodiment of the present invention.

FIG. 11 is a diagram illustrating a method for positioning short TTI subframes at a flexible DL/UL interval of normal TTI subframes in accordance with one embodiment of the present invention.

The normal TTI subframes may include a downlink dedicated interval (DL control transmission), a flexible DL/UL interval, an uplink dedicated interval (UL control transmission). A downlink dedicated interval of a length of N OFDM symbols and an uplink dedicated interval of a length M OFDM symbols may be arranged at both ends of a subframe, and the flexible DL/UL interval may be arranged between the downlink dedicated interval and the uplink dedicated interval.

A method for configuring the uplink dedicated interval subsequently to the downlink dedicated interval and then configuring the flexible DL/UL interval may be considered. In this embodiment, one method will be described for convenience of description.

The short TTI subframes may be positioned at the flexible DL/UL interval of the normal TTI subframes, and may continuously be transmitted at the corresponding position.

When N OFDM symbols of downlink are configured to be dedicated for DL, some OFDM symbols may be included in the DL dedicated interval of short TTI subframe transmission.

N OFDM symbols of downlink may be configured for an interval for transmitting a control channel for short TTI subframes.

When the flexible DL/UL interval of the normal TTI subframes is used for downlink transmission, the short TTI subframes are used for downlink transmission. At this time, a time interval for making sure of transmitting a response to an uplink and transmitting data is ensured for the short TTI subframes.

If the short TTI subframes are for downlink transmission, the downlink dedicated interval within the short TTI subframe may be used for data transmission.

The uplink dedicated time is ensured for each of the short TTI subframes continuously transmitted.

Figure 1:
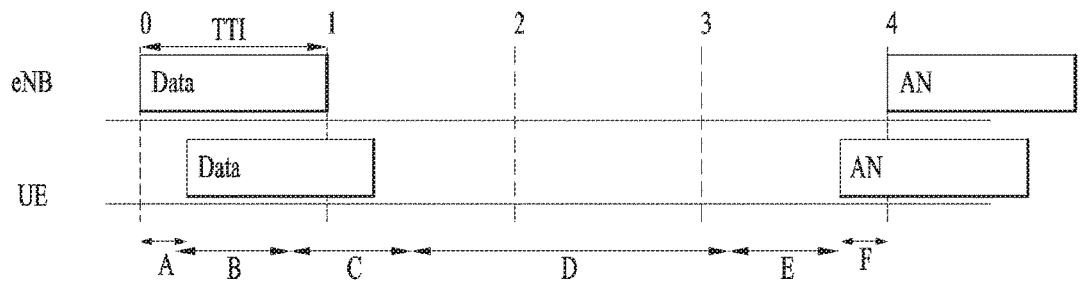
FIG. 1 is a diagram illustrating a delay generated in downlink signal transmission processing in an LTE system.

As described above, if short TTI subframe(s) is(are) positioned at the flexible DL/UL interval of the normal TTI subframes, as shown in FIG. 2-1, a symbol area where short TTI is not configured occurs in a band for positioning short TTI(s). In FIG. 2-1, first five symbols and last six symbols of a band where the short TTI subframes are located may correspond to the symbol area.

This symbol area may be used by two methods as follows.

First of all, if the short TTI subframes are scheduled to different UEs, user-specific control information may be transmitted as DL/UL control information of each short TTI subframe, and common control information common to the UEs may be transmitted through DL/UL symbols for not configuring short TTI subframe as described above.

In another way, the corresponding DL/UL symbol area may additionally be used for a UE which uses the normal TTI subframes. For example, if a specific UE uses the normal TTI subframes, the symbol area may be used to provide additional diversity gain to the specific UE.

Figure 12:
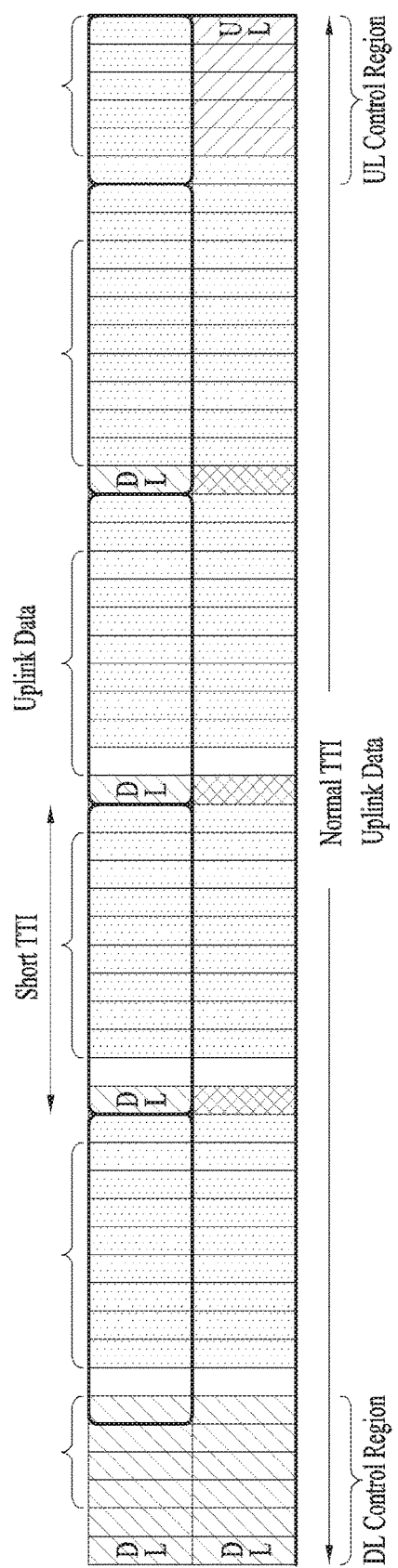
FIG. 12 is a diagram illustrating that short TTI subframes are used for uplink transmission when a flexible DL/UL interval of normal TTI subframes is used for uplink transmission in accordance with one embodiment of the present invention.

FIG. 12 is a diagram illustrating that short TTI subframes are used for uplink transmission when a flexible DL/UL interval of normal TTI subframes is used for uplink transmission in accordance with one embodiment of the present invention.

A time interval for making sure of transmitting a response to a downlink and transmitting data is ensured for the short TTI subframes.

If the short TTI subframes are for uplink transmission, the uplink dedicated interval within the short TTI subframe may be used for data transmission.

The downlink dedicated time is ensured for each of the short TTI subframes continuously transmitted.

The downlink dedicated time interval of the normal TTI subframes may be used for control channel transmission including an indicator for continuous short TTI subframes.

Some of the downlink dedicated time interval of the normal TTI subframes may be configured as a downlink dedicated time interval of the short TTI subframes.

Figure 13:
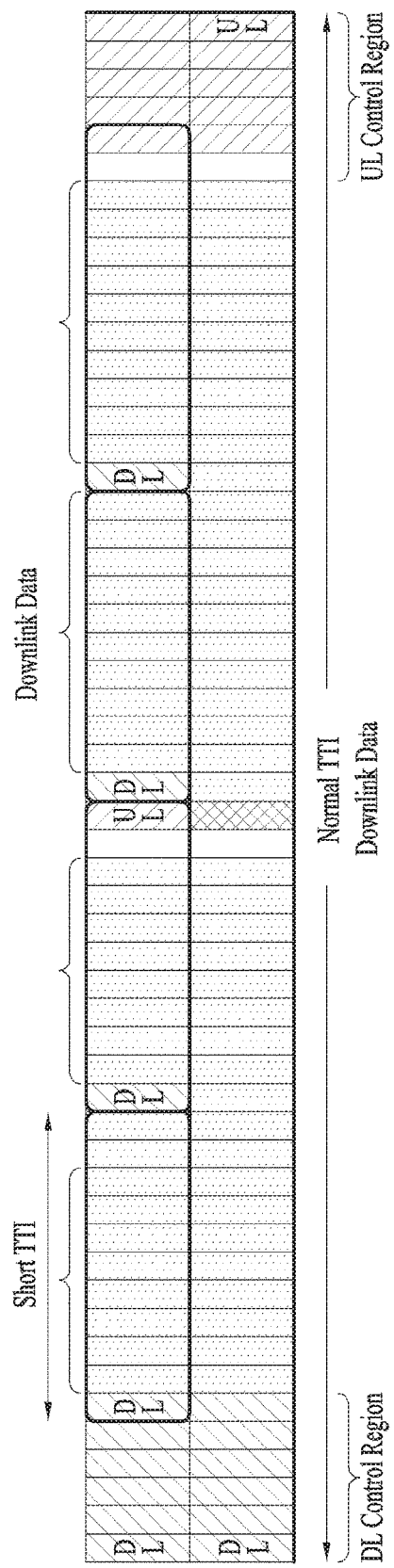
FIG. 13 is a diagram illustrating that an uplink or downlink dedicated time interval is configured at some subframes of continuous short TTI subframes and some subframes are configured as data transmission dedicated subframes in accordance with one embodiment of the present invention.

FIG. 13 is a diagram illustrating that an uplink or downlink dedicated time interval is configured at some subframes of continuous short TTI subframes and some subframes are configured as data transmission dedicated subframes in accordance with one embodiment of the present invention.

If short TTI subframes are subjected to FDM together with normal TTI subframes and thus downlink transmission (or uplink transmission) is continuously performed, some of the uplink dedicated time interval (or downlink dedicated time interval) included in the corresponding short TTI subframe is converted to a time interval for downlink transmission (or uplink transmission).

A time interval of the normal TTI subframes multiplexed with short TTI subframes, which include a time interval for specific direction link transmission, also maintains a link direction. Meanwhile, a guard period, a muting interval, etc. may be configured at a time interval of normal TTI subframes multiplexed with the short TTI subframes, which include uplink and downlink transmission periods.

When short TTI subframes continuously perform downlink transmission, the followings may be configured.

Some downlink transmission interval of the short TTI subframes is used for data transmission.

Some of the time interval of the normal TTI subframes is used as the uplink dedicated time interval of the short TTI subframes.

Downlink control channel transmission is allowed at a subframe located in the middle of the continuous short TTI subframes to make sure of freedom of degree such as HARQ/Link Adaptation/Scheduling.

Figure 14:
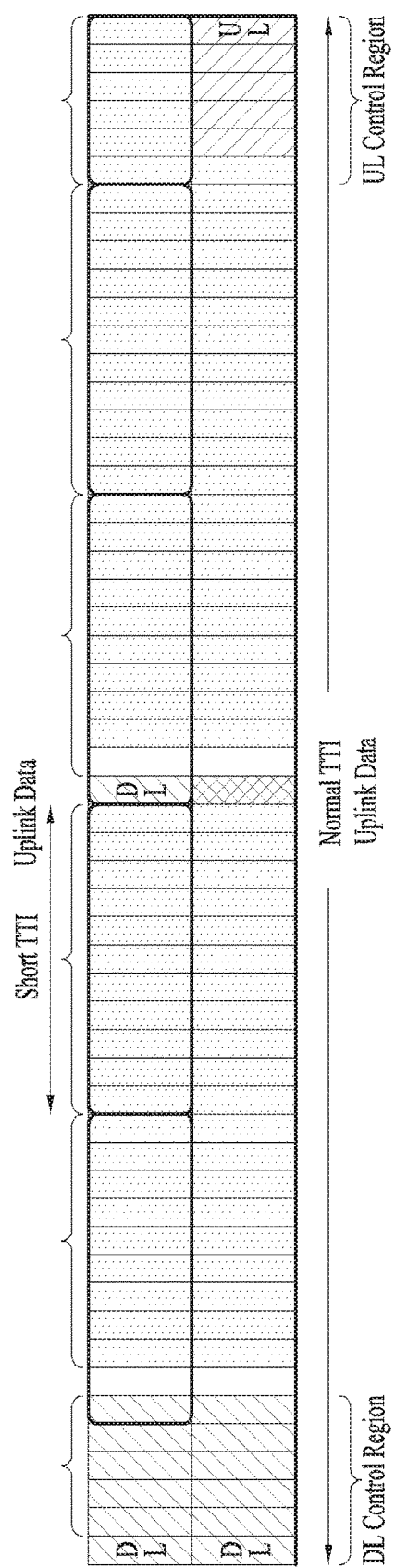
FIG. 14 is a diagram illustrating that uplink transmission is continuously performed at short TTI subframes in accordance with one embodiment of the present invention.

FIG. 14 is a diagram illustrating that uplink transmission is continuously performed at short TTI subframes in accordance with one embodiment of the present invention.

When uplink transmission is continuously performed at the short TTI subframes, the followings may be configured.

Some downlink transmission interval of the short TTI subframes is used for data transmission.

Some of the downlink time interval of the normal TTI subframes is used as the downlink dedicated time interval of the short TTI subframes.

Downlink control channel transmission is allowed at a subframe located in the middle of the continuous short TTI subframes to make sure of freedom of degree such as HARQ/Link Adaptation/Scheduling.

A response reporting timing of a data signal transmitted at a previous short TTI subframe is reconfigured depending on uplink or downlink control channel transmission included in the short TTI subframes. For example, if the response reporting timing is configured at K+N subframe but a time interval for response reporting is not configured at the corresponding subframe, reporting is performed through the most front subframe at which transmission of the corresponding control channel is ensured, among subframes behind the corresponding subframe (K+N+a subframe).

Meanwhile, a case that multiple TTI structures are multiplexed in a TDD mode will be described. Hereinafter, the TDD mode multiplexing, which will be described hereinafter, may be applied independently, or may be applied by being combined with the aforementioned FDD mode multiplexing.

Figure 15:
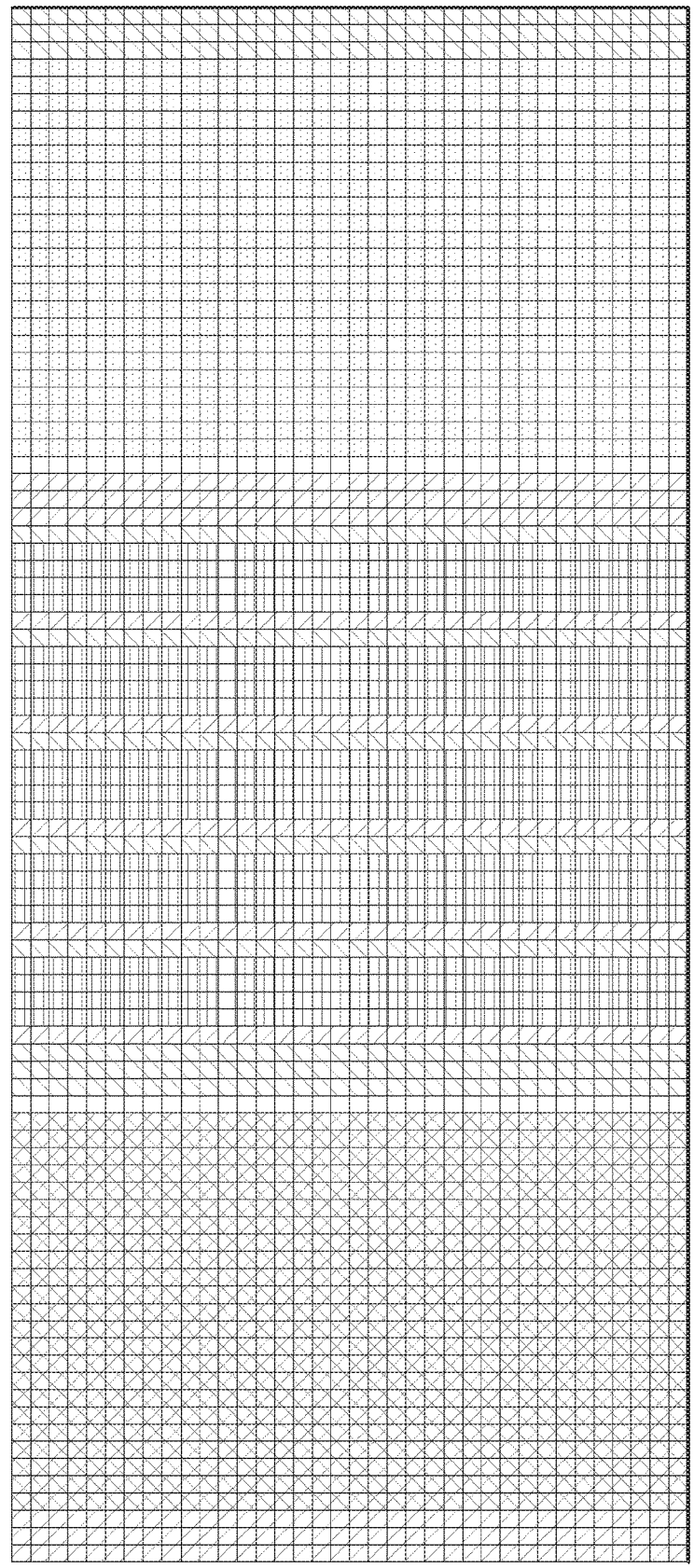
FIGS. 15 and 16 are diagrams illustrating that subframes corresponding to TTIs of different lengths are multiplexed in a TDD mode in accordance with one embodiment of the present invention.
Figure 16:
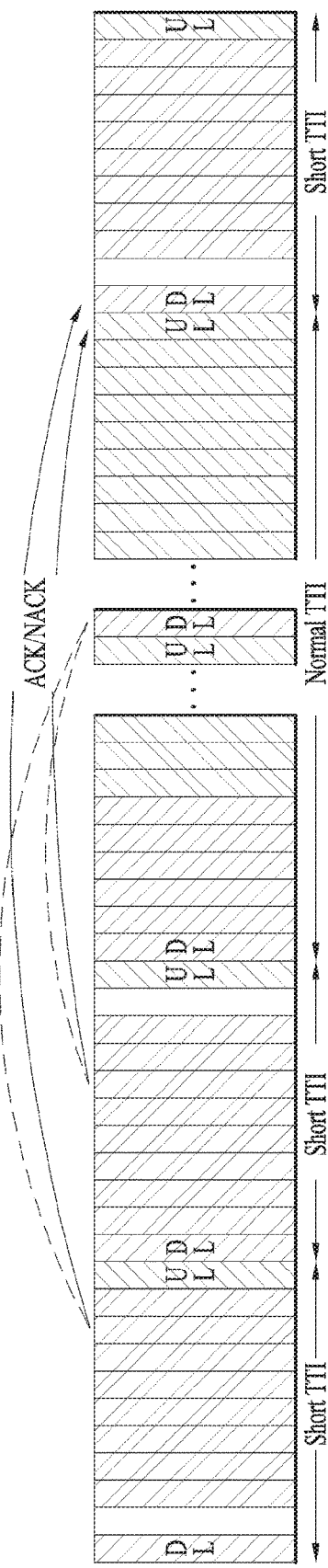

FIGS. 15 and 16 are diagrams illustrating that subframes corresponding to TTIs of different lengths are multiplexed in a TDD mode in accordance with one embodiment of the present invention.

This embodiment suggests that a time unit of time domain multiplexing of normal TTI subframes and short TTI subframes uses a normal TTI subframe length as a minimum unit.

For example, when normal TTI subframe is 1 ms and short TTI subframe is 0.2 ms, 1 ms may be used as a basic unit and short TTI may be transmitted five times as shown in FIG. 15.

Also, if heterogeneous TTIs are multiplexed in a time domain in a TDM mode, to solve a problem that a response to data transmitted at a short TTI is too delayed due to the advent of the normal TTI interval, one embodiment of the present invention suggests to configure additional UL/DL control region within the normal TTI as shown in FIG. 16 or avoid unnecessary delay by providing an indicator for such an additional control region.

Figure 17:
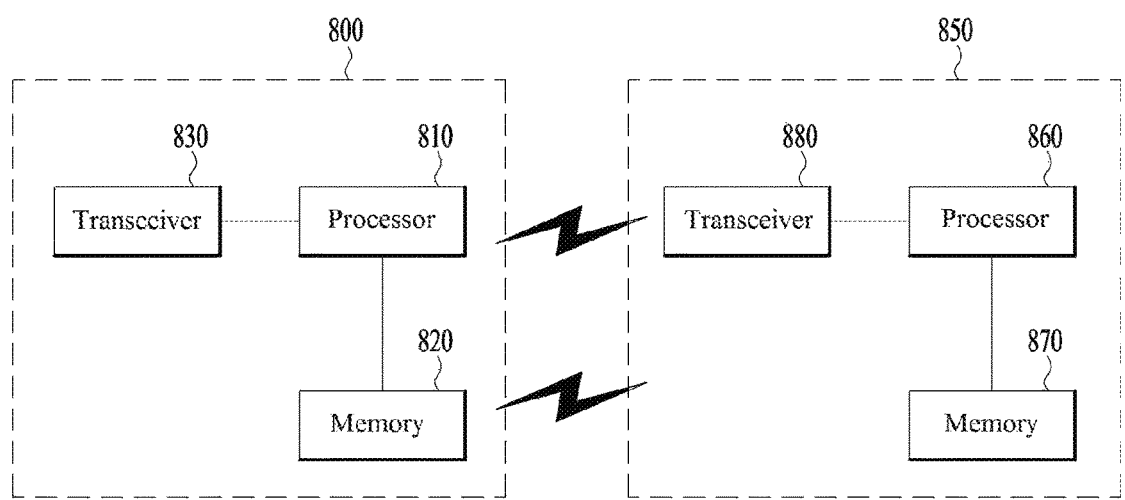
FIG. 17 is a diagram illustrating an apparatus for performing the aforementioned operation.

FIG. 17 illustrates an apparatus for performing the above-described operations.

A radio apparatus 800 shown in FIG. 17 may correspond to the aforementioned UE installed in a specific vehicle as described above and a radio apparatus 850 may correspond to the aforementioned eNB.

The UE may include a processor 810, a memory 820 and a transceiver 830 and the eNB 850 may include a processor 860, a memory 870 and a transceiver 880. The transceivers 830 and 880 transmit/receive radio signals and may be executed in the physical layer of 3GPP and the like. The processor 810/860 is executed in a physical layer and/or a MAC layer and is connected with the transceiver 830/880. The processor 810/860 can perform the aforementioned interference control procedure.

The processors 810 and 860 and/or the transceivers 830 and 880 may include a specific application-specific integrated circuit (ASIC), another chipset, a logic circuit and/or a data processor. The memories 820 and 870 may include a ROM (Read-Only Memory), a RAM (Random Access Memory), a flash memory, a memory card, a storage medium and/or another storage unit. When an embodiment is executed by software, the aforementioned methods may be executed as modules (e.g., processors or functions) which execute the aforementioned functions. The modules may be stored in the memories 820 and 870 and executed by the processors 810 and 860. The memories 820 and 870 may be provided to the inside or outside of the processors 810 and 860 or connected to the processors 810 and 860 through a known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims.

INDUSTRIAL APPLICABILITY

As mentioned in the foregoing description, the present invention can be applied to various wireless communication systems that require various TTI lengths.

The invention claimed is:

1. A method for a user equipment (UE) to receive downlink signals from a network in a wireless communication system, the method comprising:
   receiving a first downlink signal through a first downlink region of a first type transmission time interval (TTI), wherein the first downlink region starts from a first OFDM symbol and includes a first number of OFDM symbols; and
   receiving a second downlink signal through a second downlink region of a second type TTI, wherein the second downlink region starts from a second OFDM symbol and includes a second number of OFDM symbols,
   wherein a maximum value of the first number is greater than a maximum value of the second number, and
   wherein the first downlink region and the second downlink region end at a same OFDM symbol in time domain, when the second OFDM symbol is located one or more OFDM symbol later than the first OFDM symbol in time domain.

2. The method of claim 1, wherein the first type TTI is used on a first bandwidth part, and the second type TTI is used on a second bandwidth part.

3. The method of claim 1, wherein the first type TTI includes the first downlink region, a first flexible region and a first uplink region.

4. The method of claim 3 wherein the second type TTI is located on a same time domain location with the first flexible region of the first type TTI.

5. The method of claim 1, further comprising:
   receiving downlink control information including indication indicating that one or more OFDM symbols within the first downlink region is preempted; and
   processing the received first downlink signal based on that there is no downlink signal received on the one or more OFDM symbols indicated by the downlink control information.

6. A method for a network to transmit downlink signals to one or more user equipments (UEs) in a wireless communication system, the method comprising:
   transmitting a first downlink signal through a first downlink region of a first type transmission time interval (TTI), wherein the first downlink region starts from a first OFDM symbol and includes a first number of OFDM symbols; and
   transmitting a second downlink signal through a second downlink region of a second type TTI, wherein the second downlink region starts from a second OFDM symbol and includes a second number of OFDM symbols,
   wherein the network transmits the first downlink signal and the second downlink signal under a configuration that:
      a maximum value of the first number is greater than a maximum value of the second number, and
      the first downlink region and the second downlink region end at a same OFDM symbol in time domain, when the second OFDM symbol is located one or more OFDM symbol later than the first OFDM symbol in time domain.

7. The method of claim 6, wherein the first type TTI is used on a first bandwidth part, and the second type TTI is used on a second bandwidth part.

8. The method of claim 6, wherein the first type TTI includes the first downlink region, a first flexible region and a first uplink region.

9. The method of claim 8, wherein the second type TTI is located on a same time domain location with the first flexible region of the first type TTI.

10. The method of claim 6, further comprising:
    transmitting downlink control information including indication indicating that one or more OFDM symbols within the first downlink region is preempted.

11. A user equipment (UE) receiving downlink signals from a network in a wireless communication system, the UE comprising:
    a transceiver configured to receive a first downlink signal through a first downlink region of a first type transmission time interval (TTI), wherein the first downlink region starts from a first OFDM symbol and includes a first number of OFDM symbols; and to receive a second downlink signal through a second downlink region of a second type TTI, wherein the second downlink region starts from a second OFDM symbol and includes a second number of OFDM symbols; and
    a processor connected to the transceiver and processes the received first downlink signal and the second downlink signal under a configuration that:
       a maximum value of the first number is greater than a maximum value of the second number, and
       the first downlink region and the second downlink region end at a same OFDM symbol in time domain, when the second OFDM symbol is located one or more OFDM symbol later than the first OFDM symbol in time domain.

12. A network apparatus transmitting downlink signals to one or more user equipments (UEs) in a wireless communication system, the apparatus comprising:
- a transceiver configured to transmit a first downlink signal through a first downlink region of a first type transmission time interval (TTI), wherein the first downlink region starts from a first OFDM symbol and includes a first number of OFDM symbols; and to transmit a second downlink signal through a second downlink region of a second type TTI, wherein the second downlink region starts from a second OFDM symbol and includes a second number of OFDM symbols;
- a processor connected to the transceiver and controls the transceiver to transmit the first downlink signal and the second downlink signal under a configuration that:
  - a maximum value of the first number is greater than a maximum value of the second number, and
  - the first downlink region and the second downlink region end at a same OFDM symbol in time domain, when the second OFDM symbol is located one or more OFDM symbol later than the first OFDM symbol in time domain.

\* \* \* \* \*